United States Patent

Doelz

[15] 3,688,196

[45] Aug. 29, 1972

[54] QUADRATURE TRANSMISSION MODERN USING SINGLE SIDEBAND DATA DETECTION

[72] Inventor: Melvin L. Doelz, Corona Del Mar, Calif.

[73] Assignee: Control Data Corporation, Santa Ana, Calif.

[22] Filed: Nov. 2, 1970

[21] Appl. No.: 86,071

[52] U.S. Cl. ..................325/60, 179/15 BC, 325/49, 325/50, 328/166, 329/124, 332/44

[51] Int. Cl. ............................................H04b 1/00

[58] Field of Search .........179/15 BC; 325/49, 50, 60, 325/137, 138, 329, 330, 346, 351, 444, 419, 41, 433, 435, 436; 328/166; 329/122, 124; 332/22, 41, 44, 45

[56] References Cited

UNITED STATES PATENTS 3,289,082 11/1966 Shumate......................325/49
3,518,680 6/1970 McAuliffe .............179/15 BC
3,273,073 9/1966 Cutler........................325/433

*Primary Examiner*—Albert J. Mayer
*Attorney*—Spensley, Horn & Lubitz

[57] ABSTRACT

A data communications apparatus for the transmission and receipt of data. Data provided from a data processing system is modulated on two non-interfering in-phase and quadrature channels utilizing time overlapped pulses on each channel. Data modulate a digitally generated transmission signal, the two channels and carrier information being adapted to be transmitted over voice grade communication lines. Received data are detected by single side-band detection techniques, equalized for differential delay distortion effects and serially output to a receiving data processing device.

18 Claims, 10 Drawing Figures

INVENTOR
MELVIN L. DOELZ
BY Spensley, Horn & Lubitz
ATTORNEYS

INVENTOR
MELVIN L. DOELZ

BY Spensley, Horn & Lubitz
ATTORNEYS

INVENTOR
MELVIN L. DOELZ

BY Spensley, Horn & Lubitz
ATTORNEYS

INVENTOR
MELVIN L. DOELZ
BY Spensley, Horn & Lubitz
ATTORNEYS

INVENTOR
MELVIN L. DOELZ

BY Spensley Horn & Lubitz
ATTORNEYS

QUADRATURE TRANSMISSION MODERN USING SINGLE SIDEBAND DATA DETECTION

BACKGROUND OF THE INVENTION

1. Field of the Invention

The present invention high speed data communications apparatus relates generally to the field of data transmission and receiving devices and more specifically to those devices adapted to transmit and receive data in a manner which will substantially maximize the use of the available transmission bandwidth.

2. Prior Art

The increasing use of digital computers throughout the diverse segments of the economy has led to great emphasis on the need to find increasingly more efficient and faster methods of transmitting data from one location to another. The techniques which have been implemented in the past have had the effect of providing means to transmit and receive data, but the devices have failed to maximize the use of the available communications facilities.

Typically, the most readily available and least expensive communications facilities adapted for data transmission are common carrier, voice grade networks. These facilities have a nominal bandwidth from 700 Hz to 2900 Hz. To illustrate the divergence between the theoretical capacity of a voice grade facility and the nominal bandwidth set forth hereinabove, Shannon presented the following algorithm to determine the capacity of an ideal data transmission system:

$$C_{max} = 2TW \log_2 (S/N + 1)$$

where:

$C_{max}$ = maximum transmission rate (bits per second)

$T$ = time of transmission (seconds)

$W$ = bandwidth (Hertz)

$S/N$ = signal-to-noise ratio

The theoretical capacity of the voice grade channel considered above has been determined to be approximately 30,000 bits per second assuming an average signal power to additive white Gaussion noise power of 30*db*. Practical experience with conventional data transmission apparatus indicates that a capacity of approximately 2,400 bits per second or less is a more realistic value.

The discrepancies which arise between the practical and idealized data channel arise from the following limitations:

a. Gain is not constant over the usable bandwidth and zero outside of that bandwidth.

b. There is a non-linear relationship between frequency and phase shift.

c. Impulse noise is present.

d. Gain at a given frequency changes as a function of time.

e. Frequency translation changes as a function of time.

One of the most commonly used apparatus as disclosed by the prior art, is a modulator-demodulator utilizing the principle of frequency shift keying (FSK). It is understood that a modulator-demodulator is a generalized term embodying data transmission apparatus and shall hereinafter be referred to as a modem. An FSK modem divides the available bandwidth into a plurality of frequency components to transmit the digital data, the bandwidth generally being segmented into a number of independent data channels. One of the problems inherent in conventional FSK modems is that the frequency signal must be present for a sufficient length of time to permit accurate detection, therefore, this imposes a lower limit for the minimum signal duration per bit. In addition, the data capacity of the overall channel is limited since each independent frequency channel could not be reduced below the specific segment of the available bandwidth. The specific bandwidth segments chosen are dependent upon the characteristics of the detection filters, therefore, the limitation becomes a function of the equipment.

The conventional FSK modem described in the prior art was improved by the use of quenching techniques whereby the FSK signal was cut off or quenched upon detection of all usable information. This technique permits higher data rates by reducing detection time, but the total capacity of the data channel is still limited by the detection filters. The most reliable data rates achievable with FSK modems do not exceed 1,200 bits per second. The term bits per second shall hereinafter be understood to be referred to by the term Baud which is known and used by those persons having skill in the art.

The prior art also discloses the use of vestigal sideband techniques, but these apparatus are limited to data rates of approximately 4800 Baud. These modems generally use manually adjustable equalization networks to compensate for the envelope delay distortion. Although this technique is an advance over the FSK system, there is still a failure to maximize the use of available bandwidth. characteristics The modems disclosed by the prior art have increased the practical data transmission rates on voice grade channels to approximately 4800 Baud. This figure has been achieved by utilizing phase modulation or vestigal sideband techniques as opposed to the frequency shifting techniques described above. Aside from the limitation on the usable data rates, these devices still retain the inherent problems of inefficiency.

The present invention data communications apparatus substantially solves problems left unresolved by the prior art. The available data transmission rate is increased to data rates exceeding 9600 Baud by the utilization of techniques not implemented by any device disclosed in the prior art. Serial data is used to modulate two noninterfering in-phase and quadrature data channels, with each channel having time overlapped signals permitting the amount of data transmitted to be doubled given a specific signal pulse rate. The transmission signal is digitally generated improving detection, the receiving portion of the modem utilizing the experience of a learning mode to automatically provide equalization for the differential delay distortion arising out of the inherent characteristics of the specific data transmission facilities being used.

SUMMARY OF THE INVENTION

It is an object of the present invention to provide a device adapted for the high speed transmission and detection of data.

It is another object of the present invention to provide an improved data transmission and detection apparatus.

It is still another object of the present invention to provide a data transmission and detection apparatus which automatically compensates for differential delay distortion inherent in transmission facilities.

It is still yet another object of the present invention to provide an improved high speed modem adapted for use with a digital computer.

The present invention data communications apparatus utilizes voice grade communication facilities for the transmission and detection of data. The use of a voice grade network reflects the desire to provide the most economical medium for the transmission of data. It shall hereinafter be understood that reference to the transmission medium means voice grade communication facilities although more sophisticated facilities can be used.

The present invention uses a novel system for the generation, utilization and detection of phase shifted signals. The transmission of data is based upon a time division technique. After the separation of serial input data into two separate data channels, the data are used to amplitude modulate the basic transmission signal. The basic transmission signal $f(t)$ is in the form of:

$$f(t)=(1/\alpha t)\sin\alpha t$$

The spectrum of $f(t)$ is rectangular in form with all of the energy distributed between 0 to $f_o$ where $f_0=1/2T_1$ is the value of $(t)$ at the first zero crossing of $f(t)$.

A truncated version of the function $f(t)$ was selected for the shape of the signal pulse in order to maximize the use of the available bandwidth of the data channel by concentrating the transmission energy in a narrow band in the most advantageous portion of the channel and thereby minimize the effect of the differential delay distortion characteristics of typical data channels.

In a specific implementation of this technique, transmission of data is carried out with a pulse truncated at the third zero crossing of $f(t)$ on either side of $t=0$, namely, with two lobes on either side of the central lobe.

If the function $f_t(t)$ represents a truncated pulse with $(n)$ lobes on either side of the center lobe, the truncated pulse is represented as follows:

$$f_t(t)=(1/\alpha t)\sin\alpha t,\ \text{for } -(n+1)\leqq t\leqq(n+1)$$

$$f_t(t)=0,\ \text{for } -(n+1)>t>(n+1) \qquad (2)$$

The frequency spectrum of $f_t(t)$ may be determined from the following equation:

$$F_t(f)=\frac{1}{2f_0\pi}Si\left[n\pi\left(1+\frac{f}{f_0}\right)\right]+\frac{1}{2f_0\pi}Si\left[n\pi\left(1-\frac{f}{f_0}\right)\right] \qquad (3)$$

where $F_t(f)$ = frequency spectrum of $f_t(t)$ $f_0=1/T_1$ $T_1$ = value of $t$ at the first zero crossing of $f_t(t)$ $Si$ = sine integral By truncating the transmission signal after two lobes, the frequency spectrum is substantially uniform within the selected bandwidth and zero outside of that bandwidth. Although the use of additional side lobes would increase the accuracy of the approximation to a rectangular frequency distribution, the truncated signal used satisfies practical considerations.

The present invention utilizes two digital function generators to supply the digital representation of the truncated signal shown in equation (1) to each of the two data channels. Each function generator produces an overlapping sequence of truncated sin $x/x$ pulses. The resultant signals from the signal generators are obtained by adding digitally the individual pulses in each channel as encoded by the data being transmitted. The output of each encoder is input to a digital to analog converter to obtain a composite analog equivalent to each data stream.

Each data channel modulates a separate carrier signal, the two carrier signals being out of phase with respect to each other by 90°. One data channel is designated the in-phase data channel and the other the quadrature data channel. The in-phase and quadrature data channels are combined with a third signal comprising a carrier modulated to obtain twin sub-carriers bounding the bandwidth of the data channels. One of the subcarriers is used to provide phase reference information to the demodulators while the two sub-carriers in combination carry the information with regard to synchronization for the data bits. After summing the composite signal, it is heterodyned down into the frequency range of the voice grade channel and transmitted.

The demodulator utilizes single sideband techniques to detect the data. Local oscillators are used to obtain phase-locks on the twin sub-carriers after which the data are synchronized and separated. An equalizer adapted during a learning mode automatically compensates for the differential delay distortion imposed by the characteristics of the transmission network during transmission of the data. Through the use of pulse overlapping, non-interfering in-phase and quadrature data channels and amplitude encoding of the truncated signal set forth in equation (1), the present invention high speed data communication apparatus is capable of transmitting and receiving data on voice grade facilities at data rates equal to or greater than 9,600 Baud.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

DESCRIPTION OF THE PRESENTLY PREFERRED EMBODIMENT

Figure 1:
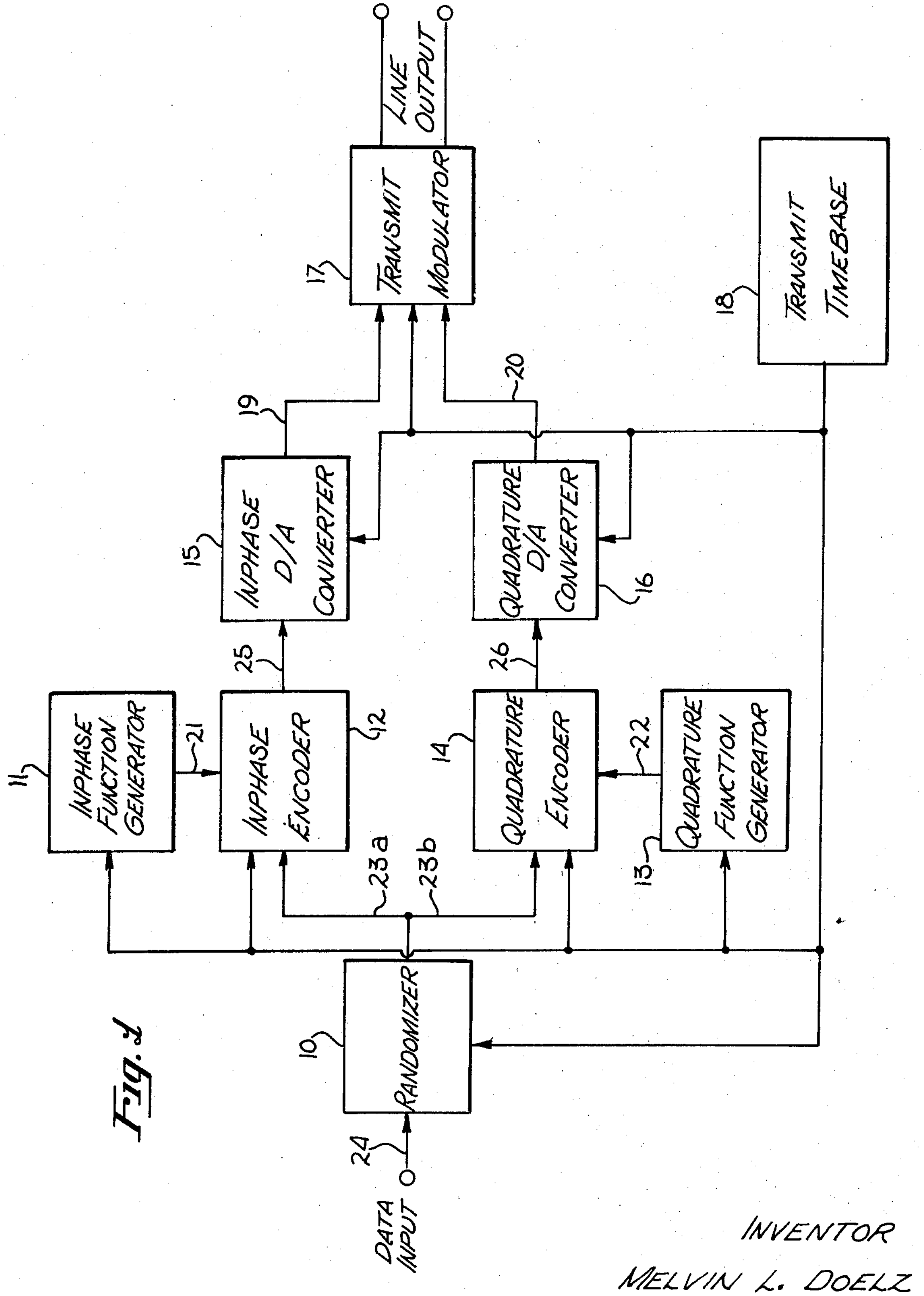
FIG. 1 is a schematic diagram, in block form, of a form of a data transmitter in accordance with the present invention.

An overall understanding of the transmission apparatus utilized by the present invention data communications apparatus can be best obtained by reference to FIG. 1. Digital data is input to the present invention at data input 24. The digital data can by synchronized or unsynchronized, but based upon the data rates being used, synchronized data are preferably provided. Randomizer 10 is a psuedo-random sequence generator which alters the state of the input data to attempt to approximately equalize the occurrence of the logical true and false states of the input data. Randomizer 10 has a counterpart in the receiver which will derandomize the data upon completion of a detection process by the receiver. Randomizer 10 digitally multiplies a fixed psuedo-random sequence by the digital data. The psuedo-randomizing process is applied to prevent repetitive patterns in the input data from biasing the various synchronizing, phase-lock and level control circuits in the receiver, all of which will be discussed in detail hereinbelow. Randomizer 10 can be implemented with a seven bit shift register with a modulo two adder that is self-synchronizing within seven bits to the psuedo-random data pattern, although other conventional digital techniques can be employed. As stated, the digital input data is altered by being multiplied by the psuedo-random binary output of randomizer 10. This would prevent an inordinately long string of a single binary digit (e.g., all zeroes) from deleteriously affecting or otherwise biasing the detection circuits in the demodulator.

Input data are transmitted on lines 23a and 23b and alternately applied to in-phase encoder 12 and quadrature encoder 14. In-phase encoder 12 and quadrature 14 are identical in structure, therefore, all discussion pertaining to the operation of in-phase encoder 12 shall apply with equal validity to the structure and operation of quadrature encoder 14. In addition, the description of in-phase function generator 11 and its operational relationship to in-phase encoder 12 shall serve to substantially explain the quadrature function generator 13 and its operational relationship to quadrature encoder 14.

Figures 3, 4, 5A, 5B:
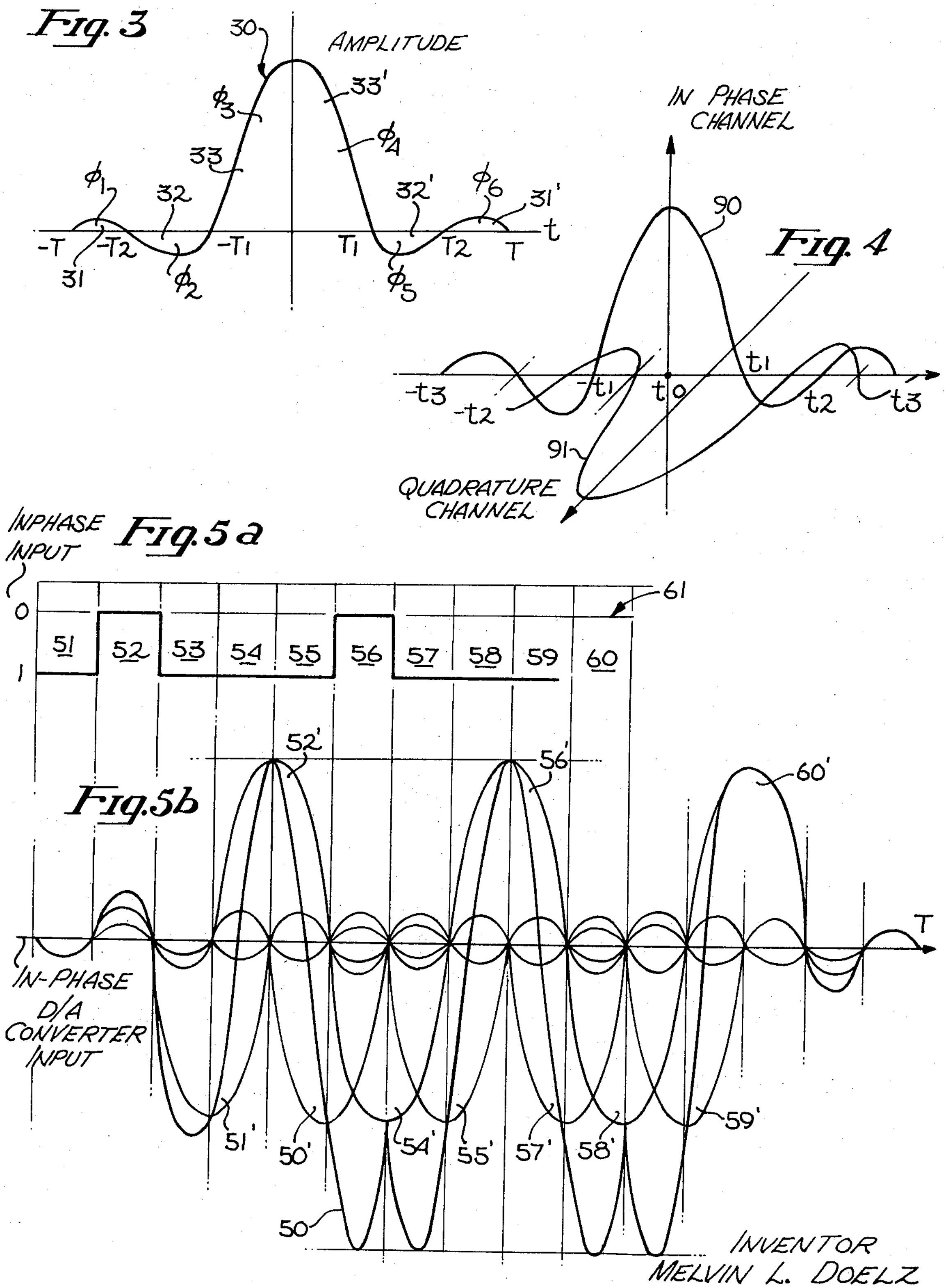
FIG. 3 illustrates the wave shape output of the function generators of FIG. 1.
FIG. 4 illustrates the phase relationship between the in-phase and quadrature data channels generated by the transmitter of FIG. 1.
FIG. 5a and 5b illustrates the wave shape of exemplary digital input data to the in-phase data channel and the output wave shape from the in-phase digital to analog converter of FIG. 1.
Figure 7:
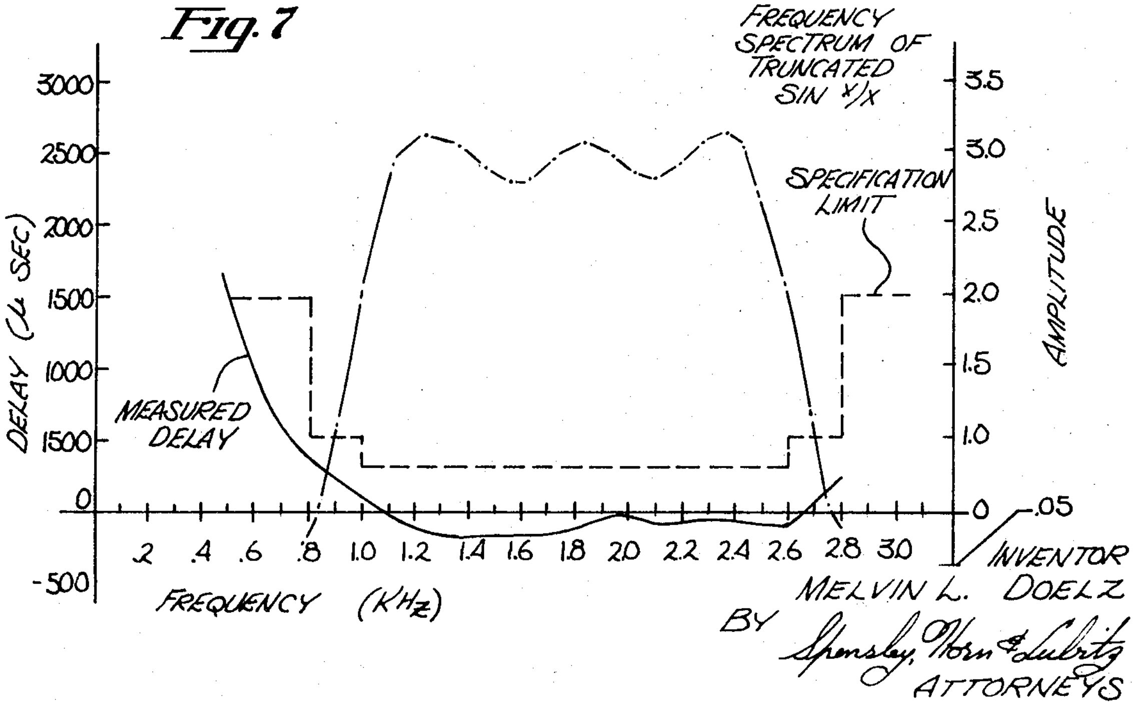
FIG. 7 illustrates the characteristics of a class 4C voice grade communications line and the superimposed frequency and distortion characteristics of a truncated signal $f(t) = (1/\alpha t)\sin\alpha t$.

In order to provide an adequate background for understanding the operation of in-phase encoder 12, the operation of in-phase function generator 11 shall be initially presented. The in-phase function generator 11 output on line 21 is a digital equivalent of a truncated sin $x/x$ pulse. The selection of the truncated sin $x/x$ pulse as the basic transmission signal provides optimum utilization of the limited bandwidth of the transmission channel. Referring now to FIG. 7, the specification limits of a voice grade communications channel (typically referred to as a Class 4C channel) are shown superimposed upon the graphical representation of the measured differential delay distortion of the line and the frequency spectrum of the signal set forth in equation (1), the data being compared at varying frequencies. The basic signaling pulse 30 is the truncated $(1/\alpha t)\sin\alpha t$ signal (hereinafter referred to as the sin $x/x$ pulse) and is shown in FIG. 3. It can be seen that the Class 4C line specifications require a maximum differential delay distortion of 300 microseconds between 1000Hz and 2600Hz. A transmission line meeting these specifications will not distort a pulse required for 9600 Baud transmission beyond acceptable limits. The frequency spectrum of the truncated sin $x/x$ pulse (FIG. 3), illustrates that the major portion of the energy thereof lies within the frequency range of 1000Hz to 2600Hz, the pulse being generated at the heterodyned equivalent of a central carrier equally spaced midway between 100Hz and 2600Hz. Another material advantage gained through the use of the truncated sin $xx$ pulse 30 shown in FIG. 3 is the zero crossing of the precursors and tails of the signal pulse, the zero crossing being at uniform intervals (T). The uniform zero crossings permit pulse overlapping without detrimental intersymbol interference.

In-phase function generator 11 generates the basic signal pulse 30 for the in-phase data channel. The truncated sin $x/x$ signal pulse 30 is generated by digital techniques from a stable frequency source derived from transmit time base 18. The truncated sin $x/x$ pulse 30 extends to include two side lobes 31, 32, 31′ and 32′ on each side of the main signaling lobe 33. The digital representation of the truncated sin $x/x$ pulse 30 corresponds to the slope values of a piece-wise approximation of the signal pulse 30. Since the signal pulses 30 are to be overlapped to achieve maximum data rates, the maximum energy of a signal pulse 30 will fall at the zero crossings of proceding or succeeding signal pulses 30. The extension of signal pulses 30 to include two side lobes 31 and 32 leads to a total overlapping of one phase of each of six signal pluses 30. Referring again to FIG. 3, pulse 30 is divided into six phases designated as $\phi_1$ through $\phi_6$. At any point in time, in-phase function generator 11 will output six digital values corresponding to the instantaneous state of each of the six overlapping lobes 31, 31′, 32, 32′, 33 and 33′.

In-phase encoder 12 accepts the digital output of in-phase function generator 11 via line 21 and scales the overlapped digital signals to conform to the coding systems being employed to pack the digital data in a most efficient manner. In-phase encoder 12 scales the digital signal by encoding one, two or three bits, the number of bits selected dependent only upon the desired data rate. Scaling data pursuant to packets of three bits per signal pulse 30 requires eight detectable levels. In-phase encoder 12 uses the following bi-polar scaling factors to adapt the amplitude of the signaling pulse 30 to the proper coded level. Although the coding set forth in the following table is preferable, other conventional coding techniques could be employed.

| 2 level coding (1 bit/signal pulse) | | 4 level coding (2 bits/signal pulse) | | 8 level coding (3 bits/signal pulse) | |
|---|---|---|---|---|---|
| Binary Code | Scale Factor | Binary Code | Scale Factor | Binary Code | Scale Factor |
| 0 | +7/7 | 01 | +6/7 | 011 | +7/7 |
| 1 | −7/7 | 00 | +2/7 | 010 | +5/7 |
| | | 11 | −2/7 | 001 | +3/7 |
| | | 10 | −6/7 | 000 | +1/7 |
| | | | | 111 | −1/7 |
| | | | | 110 | −3/7 |
| | | | | 101 | −5/7 |
| | | | | 100 | −7/7 |

Figure 8:
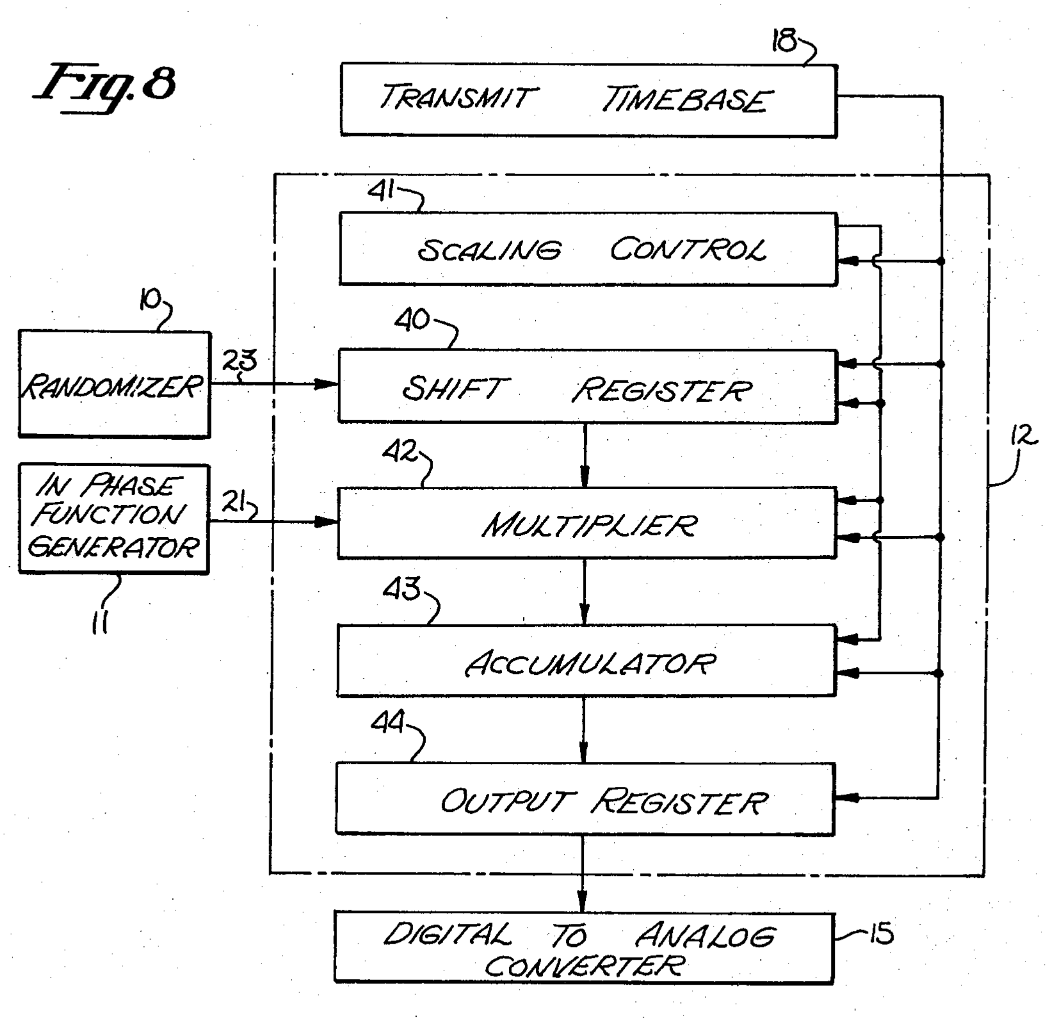
FIG. 8 is a schematic diagram, in block form, of the in-phase encoder of FIG. 1.

The generation of a composite digital signal representing the overlapping of six phases of six signal pulses 30 can be best understood from FIG. 8, wherein a detailed block diagram of in-phase encoder 12 is shown. Data are serially input on line 23 into shift register 40 from randomizer 10. Shift register 40 has a maximum capacity of eighteen bits to enable the encoding of three bits per signal pulse 30 with a total overlap of six pulse phases. At each timing interval of transmit time base 18, a digital equivalent of a composite transmission signal must be generated. In-phase function generator 11 sequentially transmits on line 21 a digital value of each of the six signal pulses 30 consistent with the predetermined overlapped status. Each bit packet stored in shift register 40 is logically combined with a scaling factor of scaling control 41 and multiplied by the proper digital representation of the phase of signal pulse 30 transmitting that bit packet to multiplier 42. The product of multiplier 42 is transmitted to accumulator 43 wherein the sum of the six digital values of the six phases of the overlap signal pulses 30 is generated. After accumulator 43 registers the digital representation of the composite signal, the data are transferred to output register 44 to await convergence by digital to analog converter 15. The binary electrical circuits used to fabricate scaling control 41, shift register 40, multiplier 42, accumulator 43 and output register 44 can be any conventional known devices used to implement high speed digital circuits but they are preferably integrated digital logic circuits where there is a desire to economize on size, space and power consumption.

As mentioned above, the same principles apply to quadrature function generator 13 and quadrature encoder 14 with the output of quadrature encoder 14 being a digital representation of the composite signal transmitted on the quadrature data channel.

The output of in-phase encoder 12 and quadrature encoder 14 are made available to in-phase digital to analog converter 15 and quadrature digital to analog converter 16 on lines 25 and 26 respectively. Digital to analog converters 15 and 16 are conventional known devices, the specific implementations of digital to analog converters 15 and 16 not being part of the present invention. The output wave form of digital to analog converters 15 and 16 can be best seen by reference to FIG. 5 *b*. To simplify the drawing, encoding of only one bit per signal pulse 30 is shown, it being understood that encoding of three bits per signal pulse 30 will only affect the amplitude of the individual signal pulses 30 and the resultant composite wave form 50. Digital wave form 61 as shown in FIG. 5 *a* comprises a serial progression of binary data signals 51 through 60. The digital wave form 61 is shown as the input to in-phase encoder 12, but as mentioned it would have equal validity as the input to quadrature encoder 14. Since the example shown in FIG. 5 is scaled to one bit per signal pulse 30, the encoding table dictates that the scaling factor of a logical (0) is +7/7 and that a logical (1) is a −7/7. To illustrate the derivation of the composite wave form 50, the equivalent of a properly scaled signal pulse 30 is shown in FIG. 5 *b* for each binary data signal 51 through 60, the equivalent pulses being designated by the corresponding reference numerals 51′ through 60′. Assuming an ideal encoding system with no delay, the input of binary data pulse 51 initiates the output of the first phase ($\phi_1$) 31 of signal pulse 51′. The succeeding binary data pulses 52 through 60, if alone, would initiate the output of the corresponding signal pulses 52′ through 60′.

Since the in-phase function generator 11 transfers a digital value for each phase of each overlapping signal pulse 30, the six digital values can be summed yielding the digital equivalent of the composite wave form 50. Composite wave form 50 is merely the output of in-phase digital to analog converter 15 based upon a composite digital input equal to the sum of the incremental values of the overlapped individual signal pulses 51′ through 60′. As set forth above, in-phase and quadrature digital to analog converters 15 and 16 are conventional, known devices the specific implementation thereof not a part of the present invention.

Figure 6:
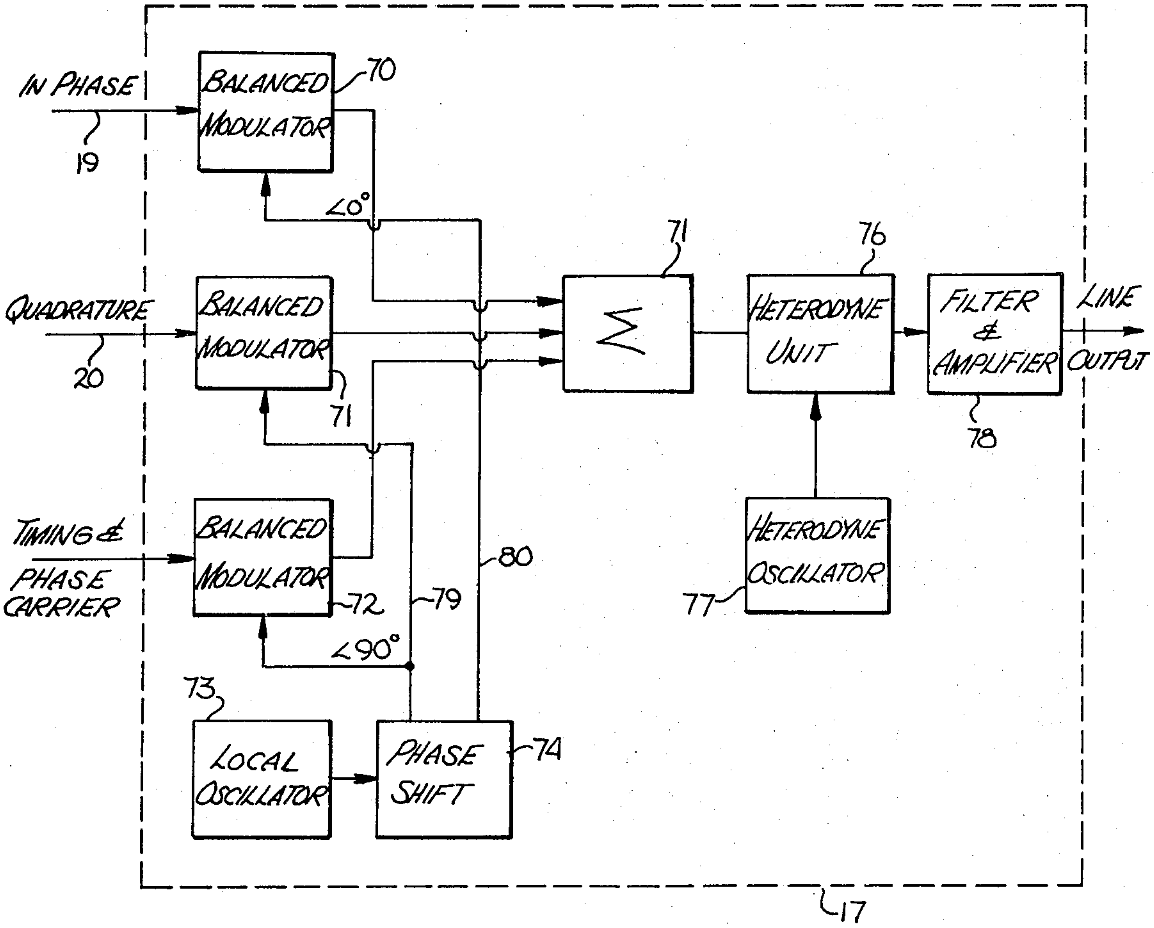
FIG. 6 is a schematic diagram, in block form, of the transmit modulator and transmit time base of FIG. 1.

The data to be transmitted on the non-interfering in-phase and quadrature data channels are transmitted to transmit modulator 17 (FIG. 1) on lines 19 and 20 respectively, transmitting modulator 17 modulating the data for transmission on the voice grade communications network. The transmission of data pursuant to the present invention can be best understood by reference to FIG. 6 wherein a detailed block diagram of transmission modulator 17 is shown. The exemplary composite wave form 50 output of in-phase and quadrature digital to analog converters 15 and 16 shows the variation in amplitude contingent upon the specific encoding plan being used. As shown in FIG. 5*b*, at the time equivalent to the coincident zero crossings of the components of composite wave form 50, the amplitude of composite wave form 50 will constitute the amplitude of the center lobe of a single component pulse. As was seen in FIG. 1, transmit time base 18 provides the timing necessary to generate the proper output from in-phase and quadrature function generators 11 and 13. To operate within the specified limits of a voice grade channel, as shown in FIG. 7, the typical frequency ($f_o$) of a signal pulse 30 is 800Hz. The frequency spectrum of a signal pulse 30 occurence represented by that shown in equation (3) set 1/*x hereinabove, the signal frequency* ($f_o$) being:

$$f_0 = \tfrac{1}{2}T_1$$

where $T_1$ is the elapsed time interval between the occurence of the maximum energy level of the truncated sin *x*/*x* pulse to the first zero crossing. At a signal pulse frequency of 800Hz, the present invention data communications apparatus enables data transmission at a rate of 9600 Baud.

The output of in-phase digital to analog converter 15 is transferred on line 19 to balanced modulator 70, the output of quadrature digital to analog 16 being transferred on line 20 to balanced modulator 71 and timing and phase information and transferred to balanced modulator 72. Carrier signals are generated by local oscillators 73 and transferred to balanced modulators 70, 71 and 72 after being subjected to the operation of phase shifter 74. The in-phase output of phase shifter 74 is transferred to balanced modulator 70 on line 80. A signal 90° out of phase with the local oscillator signal is transferred to balanced modulator 71 and 72 on line 79. A balanced modulator is a conventional device to produce a suppressed carrier, double sideband signal, the manner of implementing balanced modulators 70, 71 and 72 being well known to those persons having skill in the art.

The output signal from phase shifter 74 are preferably 500KHz carriers, the signal on line 79 being 90° out of phase with respect to the signal on line 80. For the sake of clarity, the signal on line 80 shall be referred to as the zero degree 500KHz carrier and the signal on 79 shall be referred to as the 90° 500KHz carrier. The in-phase signal is modulated on the zero degree 500KHz carrier and the quadrature signal is modulated on the 90° 500KHz carrier. To provide detection information, the same timing signal used as the basis for signal pulses 30 is used to modulate the 90° 500KHz carrier. The detection information are twin sub-carrier pilot tones located at 1000Hz and 2600Hz in the voice band. The transmission of the two subcarriers will provide all detection information necessary to demodulate the transmitted in-phase and quadrature data signals.

Referring now to FIG. 4, the relationship between non-interfering in-phase and quadrature data channels is well illustrated. A single signal pulse 90 and 91 respectively is shown in each of the in-phase and quadrature data channels. The quadrature data channel is 90° out of phase with respect to the in-phase data channel and therefore permits independent detection when beat against a properly phased signal. The output signal of transmit time base 18 having a frequency of ½*T* is used to generate the timing of signal pulses 90 and 91 and therefore proper phase detection information will be available at the demodulator.

The output of balanced modulators 70, 71 and 72 are double sideband, suppressed carrier signals, centered about the 500KHz carriers. Summing amplifier 75 receives the output signals from balanced modulators 70, 71 and 72 and generates a signal which is the composite of the double sideband, suppressed carrier signals carrying the information of the in-phase data channel, quadrature data channel and phase and timing information. Summing amplifier 75 is a conventional known device, and is preferably a resistive summing network.

In order to transmit data on a voice grade network, it is necessary to stay within the specified transmission limitations as shown in FIG. 7. The composite double sideband, suppressed carrier signal output from summing amplifier 75 is centered about the 500KHz carrier, therefore, it must be heterodyne down to the limits of voice grade facilities. Summing amplifier 75 transfers the composite signal to a heterodyne unit 76 of a conventional type. Heterodyne unit 76 will convert the carrier frequency of the composite output signal down to a frequency range within the allowable limits of the transmission medium. In this case, the limits are established by the voice grade transmission facilities. A suitable heterodyne oscillator 77 supplies a heterodyne signal to the heterodyne unit 76. The output of heterodyne unit 76 is the composite output signal heterodyned down to a center frequency within the limits of the voice grade band, and is preferably at a center frequency of 1800Hz. The heterodyned composite signal is supplied to a suitable filter and amplifier 78 to condition same for transmission on the data communications network.

Figure 2:
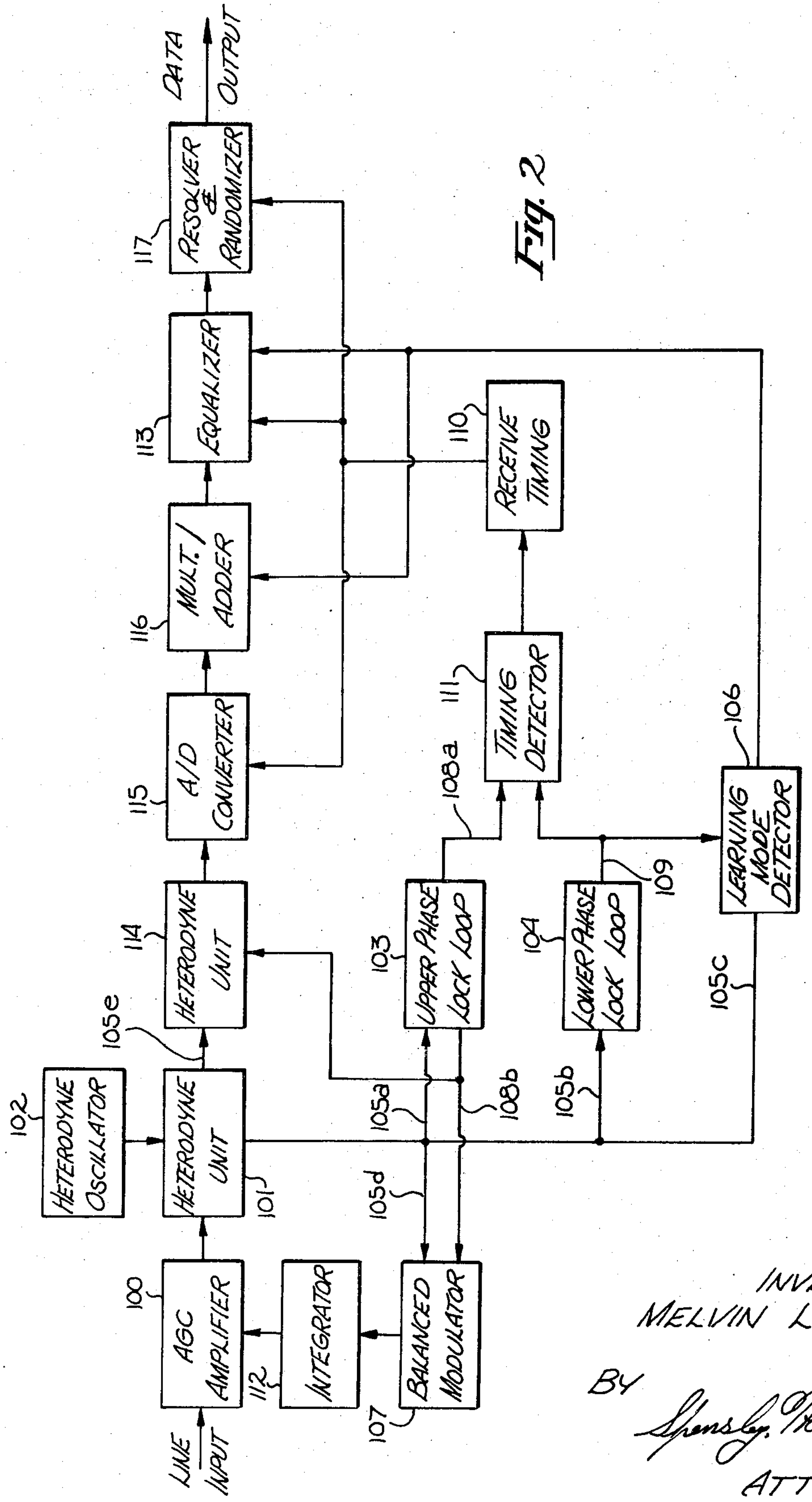
FIG. 2 is a schematic diagram, in block form, of a demodulator fabricated in accordance with the present invention.

An understanding of the detection system of the present invention can be best gained by reference to FIG. 2 wherein a form of a demodulator is shown therein. The output signal of the transmitting portion of the present invention was a composite double sideband suppressed carrier signal. The detection portion of the present invention detects the data utilizing single sideband techniques obviating the need for the complex filters required by those devices disclosed in the prior art.

The transmitted composite signal is applied to the input of automatic gain control amplifier 100 (hereinafter referred to as AGC amplifier 100) which will output a constant amplitude signal to the remainder of the detection system. The manner in which the automatic gain control is obtained will be discussed in detail hereinbelow. The output of AGC amplifier 100 has been passed through a low pass filter thereby attenuating noise signals which have been introduced during transmission, the attenuated noise signals being those which are outside the intended band-width of the transmitted signal.

The output of AGC amplifier 100 is applied to a conventional heterodyne unit 100 for shifting the transmitted signal up to a frequency in a range of about 500KHz. Although the output of heterodyne oscillator 102 is not critical, the preferred form of the present invention heterodynes the transmitted signal by modulating a 498.2KHz carrier by the transmitted signal at heterodyne unit 101. This results in the twin sub-carriers being placed at 500KHz plus 800Hz and 500KHz minus 800Hz, the bulk of the pulse energy of the in-phase and quadrature data channels appearing in the spectrum from 499.2KHz to 500.8KHz. The demodulator of the present invention data communications apparatus uses single sideband techniques and disregards the lower sideband below 498.2KHz resulting from the heterodyning at heterodyne unit 101. The output of heterodyne unit 101 is applied to upper phase-lock loop 103 on line 105*a*, lower phase-lock loop 104 on line 105*b*, learning mode detector 106 on line 105*c* and balanced modulator 107 on line 105*d*.

Figure 9:
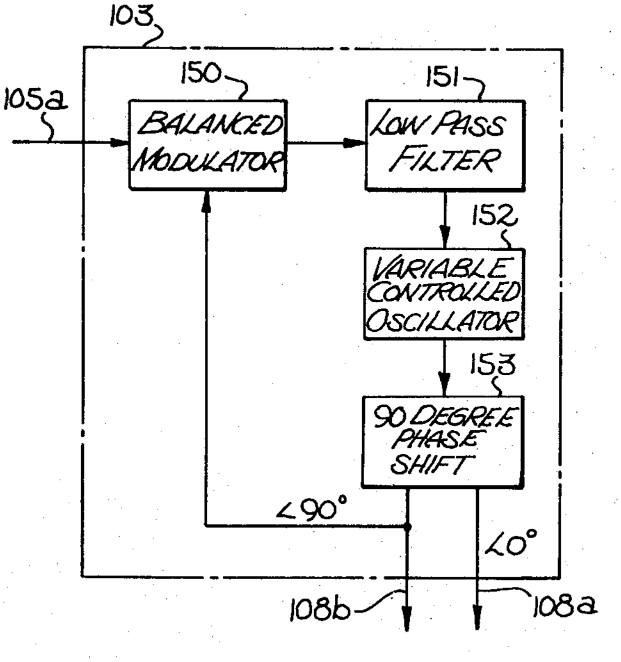
FIG. 9 is a schematic diagram, in block form, of the upper phase-lock loop of FIG. 2.

The phase and timing information are detected at upper phase-lock loop 103 and lower phase-lock loop 104. Upper phase-lock loop 103 and lower phase-lock loop 104 will output electrical signals which are in phase with the upper pilot tone and lower pilot tone respectively. Phase-lock loops 103 and 104 select, filter and amplitude limit the twin sub-carriers. The upper phase-lock loop 103 and lower phase-lock loop 104 are identical in operation, therefore a description of the upper phase-lock loop 103 shown in FIG. 9 will apply with equal validity to the structure and operation of lower phase-lock loop 104. The detected signal heterodyned at heterodyne unit 101 is applied to upper phase-lock loop 103 on line 105*a*. The upper phase-lock loop signal is developed by beating the detected signal against the output of variable controlled oscillator 152, shifted 90°, at balanced modulator 150. The output signal of variable controlled oscillator 152 is preferably 500.8KHz, but it can be any suitable frequency consistant with the value selected for heterodyne unit 101 and heterodyne oscillator 102. The output of variable controlled oscillator 152 is applied to a conventional 90° phase shifter 153 and the quadrature phase thereof used as the second input to balanced modulator 150. The output of balanced modulator 150 is applied to low pass filter 151 which yields the phase difference between the transmitted pilot tone and the output of variable controlled oscillator 152. The input to variable controlled oscillator 152 is used as the control voltage therefor and results in the adjustment which will minimize the phase difference between the two signals. In the case of lower phase-lock loop 104, the detected signal is beat against the quadrature phase of a variable controlled oscillator preferably at a frequency of 499.2KHz, the output of lower phase-lock loop 104 being in-phase with the lower sub-carrier.

Receive timing 110 is derived by processing the in-phase output signals of upper phase-lock loop 103 and lower phase-lock loop 104 at timing detector 111. The quadrature phase output of upper phase-lock loop 103 is a 500.8KHz signal and it is applied to timing detector 111 on line 108*a;* the in-phase output of lower phase-lock loop 104 is 499.2KHz signal and it is applied to timing detector 111 on line 109. Timing detector 111 utilizes a conventional mixer and generates an output sine wave equal to the difference between upper and lower phase-lock signals, i.e., 1600Hz. Resulting zero crossings define the sampling points for the data pulses. Referring back to equation (5), the frequency of the basic signal pulses 30 is equal to:

$$f_o = \frac{1}{2}T$$

where the output of received timing 110 is equal to 1600Hz, the zero crossings of the timing sine wave thereby defining all of the sampling times for the in-phase and quadrature data channels.

The control voltage for AGC amplifier 100 is a DC level developed from balanced modulator 107. The heterodyned composite signal output of heterodyne unit 101 is input to balanced modulator 107 on line 105*d*, the second input to balanced modulator 107 being the quadrature phase of upper phase-lock loop 103 appearing on line 108*b*. The output signal of balanced modulator 107 is applied to a conventional integrator 112 which yields a DC signal that is proportional to the amplitude of the received composite signal. The control signal input to AGC amplifier 100 insures that the input to the remainder of the demodulator will be a signal of substantially constant amplitude.

Since the composite data signal is being transmitted over a non-ideal network, correct detection of data requires that the effect of intersymbol interference be determined prior to data transmission. Intersymbol interference will occur as a result of the differential delay distortion inherent in non-ideal transmission networks. The objective is to minimize intersymbol interference by the addition of vectors which are equal and opposite in magnitude to the distortion components. Prior to data transmission, a learning mode will be detected by learning detector 106, the signal being initiated by the transmitting data processing system and detected by demodulating the signal on line 105*c* against the lower frequency sub-carrier derived at lower phase-lock loop 104. Upon indication of the learning mode, signal pulses 30 are transmitted at predetermined intervals, equalizer 113 anticipating the arrival of the pulses 30. Anticipation of the signal pulse 30 permits measurement and storing of the vectorial components of the amplitude and polarity of the precursors and tails of signal pulse 30. The vectors measured during the learning mode are stored in digital form, the vectorial components indicating what contributions will be added or deleted from each data pulse because of the differential delay distortion. The stored vectorial components are the digital representation of the truncated sin x/x wave form as received over the particular network being used. The equalizer 113 is used where the transmission network will introduce the delay distortion and therefore it can be deleted where such deleterious characteristics are absent.

Detection of data is accomplished by applying the heterodyned composite signal to heterodyne unit 114 on line 105*e*, and beating this against the quadrature phase output signal of upper phase-lock loop 103, thereby utilizing conventional single sideband demodulation techniques. The composite signal output from heterodyne unit 114 is the composite data signal referenced to the upper sub-carrier.

The output of heterodyne unit 114 is applied to analog to digital converter 115 which will sample the analog data at a rate consistent with the output of received timing 110. Analog to digital converter 115 provides the conversion of the detected analog data into its digital equivalent. In order to provide a constant level for the conversion process, the detected composite signal is sampled at the proper time by a conventional sample and hold amplifier. This sampled data is then held until the next data sample point, at which time a new sample level is stored. At the end of the sample period, the conversion process is initiated to convert the sample typically into a ten bit plus sign binary representation. At the end of the conversion process, the digital word is ready for parallel transfer into a holding register. Analog to digital converter 115 is a conventional device used for converting analog data to a digital form, the specific implementation not being part of the present invention.

In order to yield a precise equivalent of single sideband transmission and to allow the output of a single sideband demodulator to be used without conversion, the output of analog to digital converter 115 is multiplied in multiplier/adder 116 by a sequence of binary values having the polarity +1 and −1 and being applied to the in-phase and quadrature data as follows: , . . . , +1, +1, −1, −1, +1, +1, −1, . . . This sequence applied to the data stream yields a single sideband signal with the carrier at the upper end of the band.

As set forth above, equalizer 113 stores the digital representation of the truncated sin x/x signal pulse 30 as received on the specific transmission network, therefore, the data stream output from multiplier/adder 116 is added to a digital representation of the vectors equal and opposite in magnitude to the distortion components detected during the learning mode.

The output of equalizer 113 is applied to resolver and derandomizer 117. The polarity and amplitude of the data is used to determine the binary value of the detected signal pulse. The binary values are determined by making conventional detection decisions based upon the encoding scheme used. The binary values are then subjected to a derandomizing process consistent with that applied by transmitting randomizer 10. The derandomizer portion of resolver and derandomizer 117 is a 7-bit shift register with a modulo-two adder. The randomizer 10 of the transmitter applied a pseudo-random pattern to the input data, the opposite of which is used to restore the data to its original form.

The present invention high speed data communications apparatus provides a device which uses digital generation techniques, double sideband transmission and single sideband detection processes to provide data communications capabilities which surpass the performance of devices disclosed by the prior art.

I claim:

1. In a data communication system for transmitting data on a pair of non-interfering data channels, a modulator comprising:

a. first and second function generating means corresponding respectively to said data channels one and two, said function generating means for generating the digital representation of a signaling pulse having a substantially uniform frequency spectrum;

b. first and second encoding means each having a data input terminal, a data output terminal and a signal pulse input terminal, said signal pulse input terminals of said first and second encoding means connected to said first and second function generating means respectively said encoding means for scaling the amplitude and polarity of said respective signaling pulse consistent with the predetermined coding of the data;

c. first and second digital to analog converters each having an input and output terminal, said input terminal connected to the data output terminal of said first and second encoding means respectively;

d. timing means for generating pilot signals adapted to permit synchronization and detection of the data connected to said first and second generating means, said first and second encoding means and said first and second digital to analog converters; and e. modulating means connected to the output terminals of said first and second digital to analog converters and to said timing means, said modulating means for transmitting in-phase and quadrature double sideband, suppressed carrier electrical signals comprised of said pair of data channels and said pilot signals.

2. An apparatus as in claim 1 wherein said data is binary data.

3. An apparatus according to claim 2 including randomizing means for substantially equalizing the occurrence of the binary states of the binary data, said randomizing means connected to the data input terminals of said first and second encoding means.

4. A modulator as in claim 1 wherein said signal pulse generated by said function generating means is in the form of a truncated sin x/x.

5. An apparatus according to claim 4 wherein said modulating means comprises:

a. first, second and third balanced modulators each having a data input, a carrier input and a modulated output, the data input of said first and second balanced modulators connected respectively to the output terminals of said first and second digital to analog converters, the data input of said third balanced modulator connected to said timing means;

b. local oscillating means for generating a carrier signal of substantially a single tone;

c. a phase shift circuit having an input terminal and in-phase and quadrature output terminals, the input terminal connected to said local oscillating means, the in-phase output terminal being connected to the carrier input terminal of said first balanced modulator and the quadrature output terminal being connected to the carrier input terminals of said second and third balanced modulators whereby the data on said pair of data channels are modulated on carrier signals of substantially the same tone but out of phase with each other; and d. means for transmitting a composite signal of said data and timing signals, said means connected to the modulated output terminals of said first, second and third balanced modulators.

6. An apparatus as in claim 5 wherein said phase shift circuit is a ninety degree phase shift circuit whereby the signal at said in-phase output is shifted zero degrees with respect to the signal at the input terminal and the signal at the quadrature terminal is ninety degrees out of phase with respect to the signal at the input terminal.

7. An apparatus as in claim 6 wherein said means for transmitting a composite signal comprises:

a. a summing amplifier having at least three input terminals and an output terminal, said input terminals being connected to the modulated output terminal of said first, second and third balanced modulators; and b. heterodyining means for converting down the frequency of said transmitted, composite signal to permit transmission thereof, said heterodyning means connected to the output terminal of said summing amplifier.

8. A communication system for the transmission of data including a transmitter comprising:

a. function means for generating two independent signals $f(t)$, each of said signals being in the form $f(t) = \sin x/x$;

b. encoding means for modulating each of said independent signals $f(t)$ by two independent channels of binary data connected to said function means;

c. digital to analog converters connected to said encoding means outputting an analog signal responsive to each of said modulated signals $f(t)$; and d. modulating means connected to said digital to analog converters for receiving the output of said digital to analog converters, and generating in-phase and quadrature double sideband, suppressed carrier signals therefrom.

9. A transmitter as in claim 8 wherein said function means comprises means for sequentially generating the composite digital value of a plurality of overlapped signals $f(t)$.

10. A communication system as in claim 8 wherein said transmitter includes randomizing means for substantially equalizing the occurance of the binary state of the binary data.

11. A transmitter as in claim 8 wherein said modulating means comprises:

a, first, second and third balanced modulators each having a data input, a carrier input and a modulated output, the data input of said first and second balanced modulators connected respectively to said digital to analog convertors;

b. local oscillating means for generating a carrier signal of substantially a single tone;

c. a phase shift circuit having an input terminal and in-phase and quadrature output terminals, the input terminal connected to said local oscillating means, the in-phase output terminal being connected to the carrier input of said first balanced modulator and the quadrature output terminal being connected to the carrier input terminals of said second and third balanced modulators whereby the data on a pair of data channels are modulated on carrier signals of substantially the same tone but out of phase with each other; and d. means for transmitting a composite signal, said means connected to the modulated output terminals of said first, second and third balanced modulators.

12. A transmitter as in claim 11 wherein said phase shift circuit is a 90° phase shift circuit whereby the signal at said in-phase output is shifted zero degrees with respect to the signal at the input terminal and the signal at the quadrature terminal is 90° out of phase with the signal at the input terminal.

13. A data communication system having a modulator as defined in claim 8 and having a demodulator for detecting the transmitted composite data signal, said demodulator comprising:

a. first heterodyning means for frequency translating said composite signal up to a high frequency level;

b. upper and lower phase-lock loop means each having input and output terminals for detecting heterodyned pilot signals, the input terminals of each of said upper and lower phase-lock loop means connected to said first heterodyning means;

c. timing detector means for generating a timing signal proportional to the frequency difference between the output signals of said upper and lower phase-lock loop means, said timing detector means connected to the output terminal of said upper and lower phase-lock loop means whereby said generated timing signal is adapted for identifying the sampling times of said transmitted composite data signal;

d. second heterodyning means for beating said transmitted composite data signal against the output of said upper phase-lock loop means, said second heterodyning means having two input terminals and an output terminal said input terminals connected to the output of said first heterodyning means and the output terminal of said upper phase-lock loop means; and e. means for sampling the output of said second heterodyning means at a rate equal to said generated timing signal to provide the intelligence carried by said transmitted composite data signal.

14. An apparatus as in claim 13 wherein the frequency of said timing signal is twice the frequency of the signaling pulse.

15. An apparatus as in claim 13 wherein said demodulator includes a learning mode detector.

16. An apparatus as in claim 13 wherein said upper and lower phase-lock loop means comprise:

a. a variable controlled oscillator having an output frequency which is consistent with that of said first heterodyning means;

b. a phase shift circuit connected to the output of said variable controlled oscillator, said phase shift circuit having zero degree and ninety degree phase shift output terminals;

c. a balanced modulator having a data input, a carrier input and an output terminal, said carrier input being connected to the ninety degree phase shift output terminal of said phase shift circuit whereby an output signal proportional to the frequency difference between said variable controlled oscillator and said transmitted composite signal is generated; and d. means for connecting the output of said balanced modulator to the input of said variable controlled oscillator whereby the frequency difference signal is adapted to be nulled to zero.

17. An apparatus as in claim 13 wherein said means for sampling the output of said second heterodyning means includes means for registering the differential delay distortion.

18. A demodulator for detecting two non-interfering channels of intelligence transmitted as a composite signal comprising two data signals 90° out of phase with respect to each other and a pair of pilot tones adapted to provide synchronization and phase information comprising:

a. first heterodyning means for receiving the transmitted composite signal and frequency translating the composite signal up to a high frequency level;

b. upper and lower phase lock loop circuits, each comprising:

i. a variable controlled oscillator having an output signal the frequency of which is consistent with that of said first heterodyning means;

ii. a phase shift circuit connected to the output of said variable controlled oscillator, said phase shift circuit having zero degree and 90° phase shift output terminals;

iii. a balanced modulator having a data input connected to said first heterodyning means to receive said translated composite signal, a carrier input and an output terminal, said carrier input being connected to the 90° phase shift output terminal of said phase shift circuit whereby an output signal proportional to the frequency difference between said variable controlled oscillator and the composite signal is generated; and iv. means for connecting the output of said balanced modulator and the input to said variable controlled oscillator whereby the frequency difference signal is adapted to be nulled to zero;

c. timing detector means for generating a timing signal proportional to the frequency difference between the output signal of said upper and lower phase-lock loop circuits, said timing detector means connected to the output terminal of said upper and lower phase-lock loop circuits whereby said generated timing signal is adapted for identifying the sampling time of the composite signals;

d. second heterodyning means for beating the output of said first heterodyning means against the output of said upper phase-lock loop circuit connected to said second heterodyning means and the 90° phase shift output terminal of said upper phase-lock loop circuit; and e. means for sampling the output of said second heterodyning means at a rate equal to said generated timing signal to provide the intelligence carried by the composite signal and vectorially adding to the output of said second heterodyning means differential delay distortion vectors, said means for sampling being connected to said second heterodyning means.

* * * * *